United States Patent [19]

Barth

[11] 4,225,080

[45] Sep. 30, 1980

[54] DAMPER CONSTRUCTION FOR A GAS FIRED COMBUSTION APPARATUS

[75] Inventor: James T. Barth, Wisconsin Rapids, Wis.

[73] Assignee: Barth, Inc., Wisconsin Rapids, Wis.

[21] Appl. No.: 922,780

[22] Filed: Jul. 7, 1978

[51] Int. Cl.³ .................. G05D 23/00; F23N 1/00
[52] U.S. Cl. ....................... 236/1 G; 236/93 R; 236/96; 431/20
[58] Field of Search ............... 236/1 G, 21, 49, 93 R, 236/96; 431/20; 126/285 B; 110/163

[56] References Cited

U.S. PATENT DOCUMENTS

| | | | |
|---|---|---|---|
| 160,496 | 3/1875 | Woodruff | 126/285 |
| 1,938,625 | 12/1933 | Engels | 431/20 X |
| 1,963,073 | 6/1934 | Butler | 236/45 |
| 1,973,997 | 9/1934 | Roberts | 236/45 |
| 1,993,069 | 3/1935 | McConnell, Jr. | 137/152 |
| 2,007,486 | 7/1935 | Trethewey | 236/93 R X |
| 2,112,554 | 3/1938 | Beam | 431/20 |
| 2,208,746 | 7/1940 | Breese | 236/1 G |
| 2,302,197 | 11/1942 | Edwards | 126/15 X |
| 2,342,725 | 2/1944 | Besten et al. | 236/75 |
| 2,345,997 | 4/1944 | Anderson | 74/531 |
| 2,381,437 | 8/1945 | Crew et al. | 236/45 |
| 2,390,483 | 12/1945 | Wingert | 126/73 |
| 2,393,482 | 1/1946 | Smith | 126/295 |
| 2,508,885 | 5/1950 | MacKay | 431/20 |
| 3,366,333 | 1/1968 | Diehl | 236/93 R |
| 3,580,238 | 5/1971 | Diehl | 126/295 |
| 4,017,026 | 4/1977 | Felter | 236/93 R |
| 4,046,318 | 9/1977 | Ripley | 236/1 G |
| 4,108,369 | 8/1978 | Prikkel III | 236/1 G |
| 4,114,805 | 9/1978 | Humphreys et al. | 236/1 G |
| 4,138,060 | 2/1979 | Iacono | 236/1 G |
| 4,143,811 | 3/1979 | Sattman | 236/1 G |

FOREIGN PATENT DOCUMENTS 346020 12/1921 Fed. Rep. of Germany ...... 126/285 R
512950 2/1921 France ................................ 126/285 R Primary Examiner—Albert J. Makay
Assistant Examiner—Harry B. Tanner
Attorney, Agent, or Firm—Andrus, Sceales, Starke & Sawall

[57] ABSTRACT

A thermally controlled damper construction for a gas fired combustion apparatus, such as a furnace. The damper has a generally eliptical shape and is mounted on a shaft in the stack or flue for pivotal movement from a closed position, where the damper is located at an angle of approximately 45° with respect to the axis of the stack, to a full open position. One edge of the damper is recessed to provide a vent opening between the damper and the stack and permit venting of gases generated by operation of the pilot light during periods when the furnace is not operating. The damper is moved between the closed and open positions by a bi-metallic element which is located upstream of the damper and connected to the damper by a linkage. When the furnace is operated, the increase in flue temperature will operate the bi-metallic element to move the damper to the open position. A temperature responsive safety switch is located upstream of the damper adjacent the vent opening and is operably connected to the gas supply of the furnace. In the event the damper does not open when the furnace is operated, the safety switch will shut off the gas supply to the furnace.

4 Claims, 5 Drawing Figures

DAMPER CONSTRUCTION FOR A GAS FIRED COMBUSTION APPARATUS

BACKGROUND OF THE INVENTION

Various types of automatic damper control devices have been marketed for use with furnaces, hot water heaters and other heating devices for the purpose of minimizing the loss of heat and conserving fuel. Damper control devices are normally designed to close the flue or stack during periods when the furnace is not operating to prevent the stack heat from being dissipated to the atmosphere and to prevent the loss of conditioned air from the room by convection through the stack. When the furnace is operated, the automatic damper control device will move the damper to an open position to permit flow of the waste gases of combustion to the atmosphere.

In one common form of automatic damper control, the damper is moved between the closed and open positions by an electric motor which is operably connected to the room thermostat in the building. When the thermostat calls for heat, the motor is operated to move the damper to the open position. Motor controlled dampers require relatively expensive components, and if the electrical power is shut down the damper control will be inoperative.

Another type of automatic damper control is a pressure responsive type which is used with oil fired furnaces. As shown in the patent to Scott U.S. Pat. No. 1,743,731, the pressure of the draft in the flue will open the damper when the motor blower of the furnace is operated. When the operation of the blower is discontinued, the damper will move by gravity to the closed position.

Automatic damper controls have also been constructed utilizing a temperature responsive mechanism, such as a bi-metallic element, to control the operation of the damper as disclosed in U.S. Pat. No. 3,366,333.

SUMMARY OF THE INVENTION

The invention relates to an improved thermally controlled damper for an exhaust flue of a combustion apparatus, such as a furnace, water heater or the like. In accordance with the invention, a damper, having a generally elliptical shape, is mounted for pivoting movement within the stack or flue from a closed position, where the damper is located at an angle of approximately 45° with respect to the axis of the stack, to a full open position where the damper is generally parallel to the stack axis.

Operation of the damper is controlled by a bi-metallic element which is located upstream of the damper and operably connected to the damper shaft by a linkage. When the furnace is operated, the increase in stack temperature will actuate the bi-metallic element to pivot the damper through the linkage from the closed to the open position.

To provide a vent for the gases of combustion generated by the pilot light when the furnace is not operating, the edge of the damper is recessed to provide a vent opening between the recessed edge and the internal diameter of the stack. The vent opening permits predetermined leakage through the stack sufficient to maintain the pilot light and prevent the buildup of waste gases of combustion resulting from the burning of the pilot light.

A temperature responsive safety switch mechanism is located upstream of the damper adjacent the vent opening and is operably connected to the gas supply for the furnace. In the event the damper, for some reason, does not open when the furnace is operated, the buildup of temperature in the stack actuates the safety switch to shut off the gas supply to the furnace and prevent spillage of the waste gases of combustion through the the draft hood into the building.

Connected to the outer end of the damper shaft is an indicator knob which provides a dual function. An indicator line or making on the knob shows the position of the damper. In addition, by manually turning the knob while the furnace is operating, the damper can be moved to the closed position to check the operation of the safety mechanism.

The use of the elliptical-shaped damper decreases the amount of pivotal movement required in moving the damper from the closed to the open position. In the closed position, the damper is at an angle of approximately 45° with respect to the axis of the flue or stack. Thus, the damper is required to be moved only through an angle of about 45° between the closed and open positions.

The use of the recessed edge on the elliptical damper plate provides a convenient means of producing a vent opening for the pilot light during periods of non-operation of the furnace.

The temperature responsive safety mechanism provides a fail-safe operation which will automatically shut off the gas supply to the furnace in the event the damper is not moved to the open position, thereby preventing spillage of the waste gases of combustion through the draft hood into the building.

The indicator knob cooperates with the safety switch to not only provide an indication of the damper position, but also enables the damper to be manually moved to the closed position when the furnace is operating to check operation of the safety mechanism.

Other objects and advantages will appear during the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
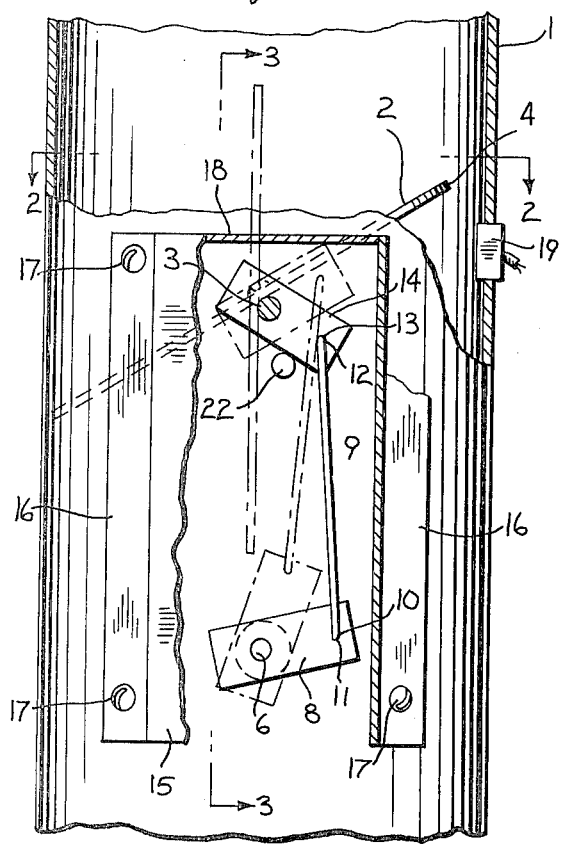
FIG. 1 is a side elevation of a furnace exhaust stack incorporating the thermally controlled damper of the invention, with parts broken away in section.

The drawings illustrate a stack or flue 1 which is connected to a gas-fired, draft hood, combustion apparatus, such as a furnace, hot water heater, space heater, or the like. Mounted within the stack 1 is a damper 2 which is secured to a shaft 3 that extends transversely across the stack 1. The damper 2 has a generally elliptical configuration and when in the closed position, as shown in FIG. 1, the damper is positioned at an angle of about 45° with respect to the axis of the stack 1.

A portion of the peripheral edge of the damper plate is cut off or recessed, as indicated by 4, to define a vent opening or space between the edge 4 and the interior wall of the stack when the damper is in the closed position. The vent opening permits controlled leakage of waste gases of combustion resulting from the burning of the pilot light and prevents the build-up or spillage of these waste gases into the building during periods of non-operation of the furnace.

Figure 3:
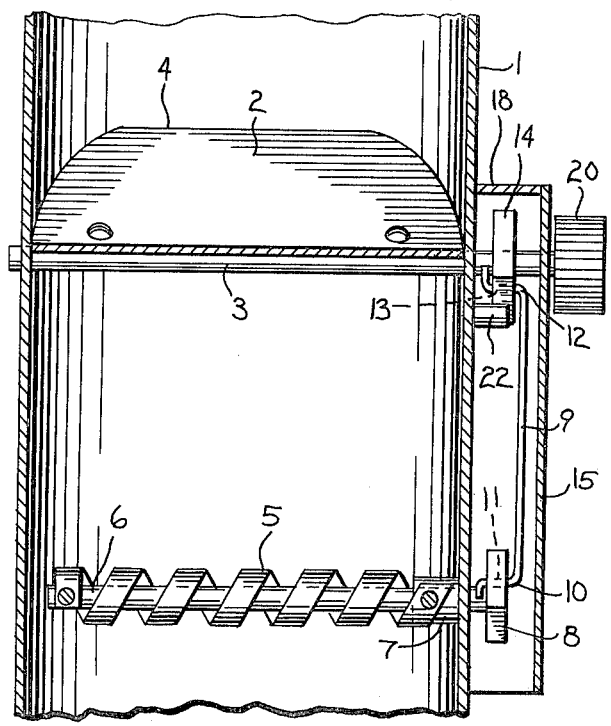
FIG. 3 is a section taken along line 3—3 of FIG. 1.

The damper is pivoted from the closed position to the full open position, as shown by the phantom lines in FIG. 1, by a thermally responsive member, such as bi-metallic element 5, which is located upstream of the damper 2. The bi-metallic element 5 is disposed in helical form with one end being connected to the outer end of a central rod 6, while the inner end of the element is connected to a hub 7 attached to the wall of the stack. The outer end of rod 6 projects through the wall of the stack and is connected to one end of a link 8, while the opposite end of the link 8 is attached to the end of a rod 9. As best shown in FIG. 3, the rod 9 is provided with a bent end portion 10 which is secured within an opening 11 in link 8.

The opposite end of rod 9 is also provided with a bent end 12 which is received within opening 13 in a link 14 which is attached to the damper shaft 3. An increase of temperature within the stack will cause the bi-metallic element to rotate the rod 6, and rotation of the rod is transmitted through the linkage 8, 9, 14 to rotate the damper shaft 3 and thus move the damper from the closed to the open position.

On a decrease in temperature, when operation of the furnance is terminated, the bi-metallic element 5 will rotate the rod 6 in the opposite direction, to thereby pivot the damper 2 through the linkage from the open to the closed position.

Figure 2:
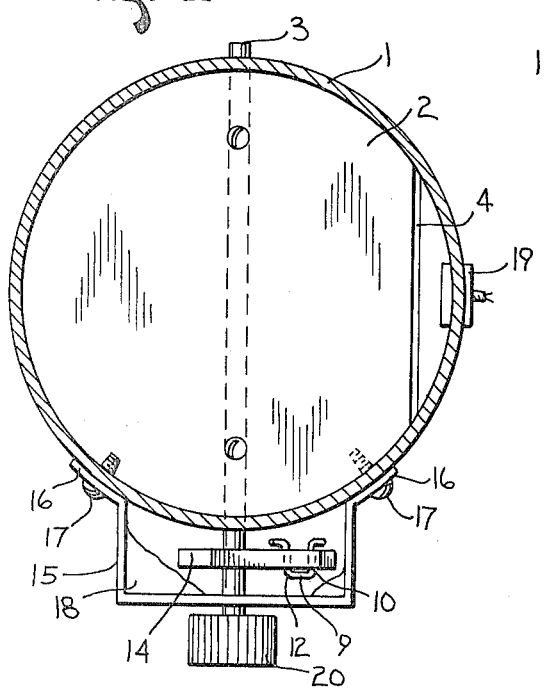
FIG. 2 is a section taken along line 2—2 of FIG. 1.
Figure 4:
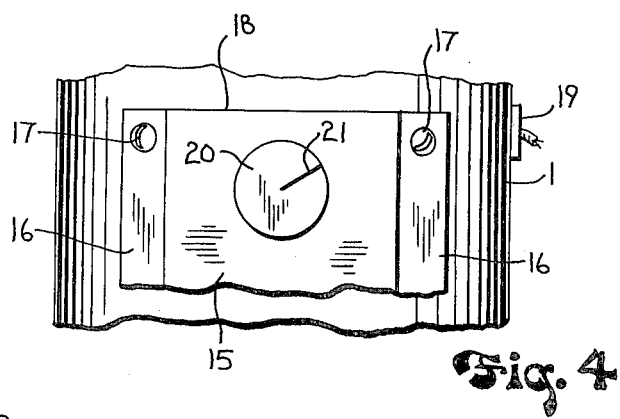
FIG. 4 is a fragmentary side elevation showing the indicator knob.
Figure 5:
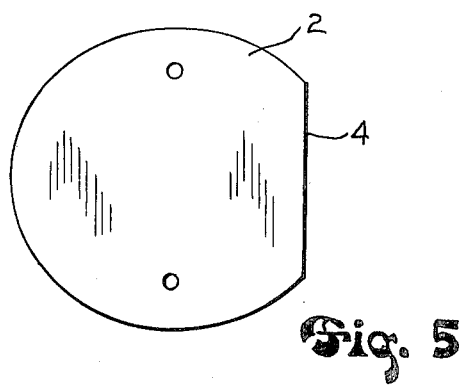
FIG. 5 is a plan view of the damper.

The linkage is contained within a housing 15 that is secured to the outer wall of the stack 1. As best shown in FIGS. 1 and 2, the housing is provided with a pair of side flanges 16 which are secured to stack 1 through screws 17. Housing 15 also includes a closed top portion 18.

Mounted in the wall of the stack 1 is a temperature responsive manually resettable safety switch 19 which is operably connected to the solenoid valve that controls the supply of gas to the furnace.

As best shown in FIG. 1, the switch 19 is located upstream of the damper plate adjacent the edge 4 of the plate. The safety switch is activated by the external temperature of the stack which is greatest at the point just opposite the vent opening defined by edge 4. In the event the damper, for some reason, does not open when the furnace is operated, the safety switch 19 will be actuated to shut off the supply of gas to the furnace. This ensures that the waste products of combustion are not spilled through the draft hood into the building.

In practice, the bi-metallic element 5 is constructed so as to begin opening the damper 2 when the stack temperature is approximately 150° F., and the damper will be fully open at a stack temperature of 200° F. The safety switch 19 is set for a higher temperature, usually about 260° F., and is manually resettable so that the gas supply to the furnace will not be restored until the switch 19 is manually reset.

Attached to the outer end of the damper shaft 3 is an indicator knob 20 which is located on the outer surface of housing 15. Knob 12 includes an indicator line or marking 21 which corresponds to the position of the damper 2. Thus, the marking 21 provides a visual indication of the position of the damper.

The knob 20 provides an additional function in that by manually turning the knob, the damper 2 can be moved against the force of the bi-metallic element 5 from the open to the closed position when the furnace is operated. With the damper being held in the closed position while the furnace is operating it permits a check to be made on the operation of the safety switch 19.

The pivotal movement of the damper 2 between the open and closed positions is limited by a pair of stops. The engagement of the upper link 14 with stop 22 will position the damper plate in the closed position. As the damper plate is moved to the open position, the upper edge of the link 14 will engage the top wall 18 of the housing 15 to limit the open position of the damper.

Due to the elliptical shape of the damper, decreased pivotal movement is required in moving the damper from the closed to the open position and this results in a shorter response time for the damper.

The thermally responsive safety mechanism is positioned in the wall of the stack adjacent the damper vent, which is the area of greatest heat build-up in the event the damper does not open on operation of the furnace. The safety mechanism under these conditions will operate to shut off the flow of gas to the furnace and insure that the waste gases of combustion are not spilled into the building.

The indicator knob 20 provides a dual function in not only providing a visual indication of the position of the damper but also enables the damper to be moved to the closed position when the furnace is operating to check the operation of the safety switch 19.

Use of the damper control of the invention minimizes dissipation of the stack heat to the atmosphere and prevents convection loss of heated room air through the stack which can result in fuel savings of up to 30%.

Various modes of carrying out the invention are contemplated as being within the scope of the following claims particularly pointing out and distinctly claiming the subject matter which is regarded as the invention.

I claim:

1. A thermally responsive damper for a gas fired combustion apparatus, comprising a stack connected to the combustion apparatus and adapted to conduct waste gases of combustion, a damper disposed within the stack, means for mounting the damper for pivotal movement with respect to the stack, said damper having a generally elliptical configuration and being pivotable from an inclined closed position where the damper is located at an acute angle with respect to the axis of the stack to an open position where the damper is located generally parallel to the axis of the stack, said damper when in the closed position having a high end and a low end, vent means disposed in the high end of said damper adjacent the stack to provide a vent for said gases when the damper is closed, thermally responsive means disposed in the stack upstream of the damper and responsive to a predetermined temperature in said stack, a linkage operably connecting the thermally responsive means and said damper whereby an increase of temperature to said predetermined temperature will actuate said thermally responsive means and operate said linkage to move the damper from the closed to the open position, and a thermally responsive safety mechanism including a resettable switch disposed immediately upstream of the high end of said damper and located adjacent said vent means, whereby the inclined closed position of the damper causes the gases of combustion to flow toward the vent means adjacent the safety mechanism to enable the safety mechanism to sense the temperature of the gases of combustion, said safety mechanism being responsive to a predetermined temperature in said stack and being operably connected to said combustion apparatus whereby an increase in temperature in said stack due to a failure of the damper to open when the combustion apparatus is operating will actuate said safety mechanism to shut off operation of the combustion apparatus.

2. The construction of claim 1, and including means connected to the damper and located outside of the stack for manually pivoting the damper between the open and closed positions.

3. The construction of claim 2, wherein said last named means comprises a knob, and said apparatus includes an indicator associated with said knob to visually indicate the position of the damper within the stack, rotation of said knob in one direction when the damper is in the open position and the combustion apparatus is operating pivoting the damper to the closed position against the force of said thermally responsive means to thereby substantially prevent the escape of said gases through said stack and effect actuation of said safety mechanism.

4. The construction of claim 1, wherein a portion of the peripheral edge of the high end of the damper is spaced from the stack and defines said vent means.

* * * * *